No. 827,465. PATENTED JULY 31, 1906.
G. PILLER.
BEER SIPHON.
APPLICATION FILED JAN. 24, 1906.
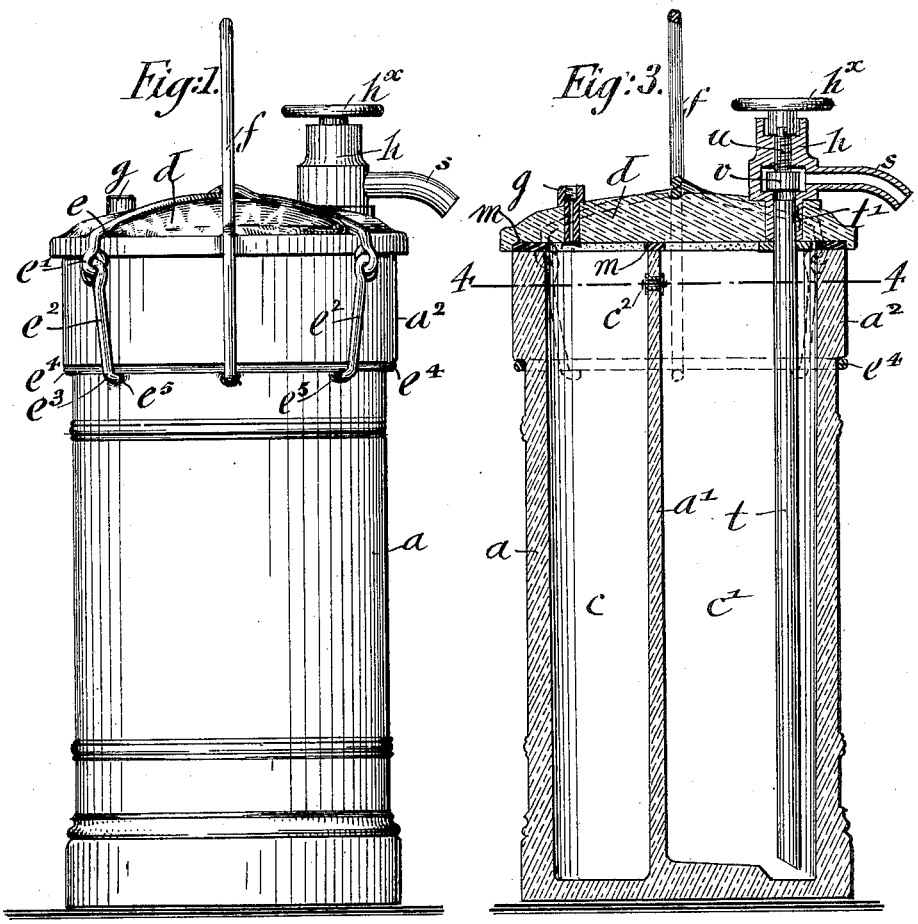
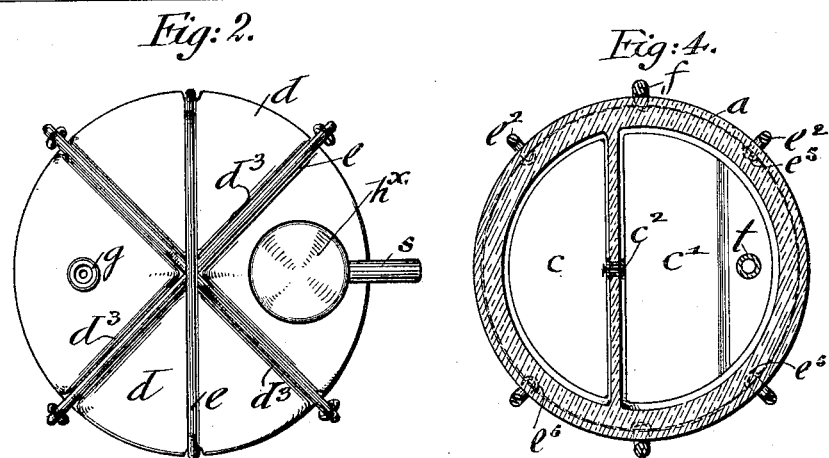
Witnesses
Fannie Fist
Henry J. Suhrbier
Inventor
Georg Piller
By his Attorneys
James Goevel

UNITED STATES PATENT OFFICE.

GEORG PILLER, OF NEW YORK, N. Y.

BEER-SIPHON.

No. 827,465.     Specification of Letters Patent.     Patented July 31, 1906.

Application filed January 24, 1906. Serial No. 297,534.

*To all whom it may concern:*

Be it known that I, GEORG PILLER, a citizen of the United States, residing in New York, in the borough of the Bronx and State of New York, have invented certain new and useful Improvements in Beer - Siphons, of which the following is a specification.

This invention relates to certain improvements in beer siphons or vessels, in which beer or other fermented liquors can be maintained under pressure of carbonic-acid gas and drawn off in suitable quantities as desired, the siphons being constructed of such size and shape that the same can be readily placed in the ice-box, conveniently shipped, and reliably operated both when filling and discharging the same; and for this purpose the invention consists of a siphon for beer and similar liquors comprising a vessel which is divided by a transverse partition into a compartment for the liquor and a smaller compartment for the gas, said partition being provided at its upper portion with a check-valve, a detachable cover provided with an inlet-valve for permitting the charging of the gas-compartment, an outlet-tube in the larger compartment, a valve-casing at the upper end of said tube, a valve in said casing controlling said tube, and a spout connected with said casing for permitting the discharge of the liquid in the larger compartment.

The invention consists, further, of certain details of construction which will be fully described hereinafter and finally pointed out in the claims.

In the accompanying drawings, Figure 1 is a side elevation of my improved beer-siphon. Fig. 2 is a top plan view of the same. Fig. 3 is a vertical central section; and Fig. 4 is a horizontal section on line 4 4, Fig. 2.

Similar letters of reference indicate corresponding parts in the different figures of the drawings.

Referring to the drawings, $a$ represents a glass vessel which is preferably made cylindrical in shape, closed at the bottom and open at the upper end. The vessel $a$ is provided with an integral flat transverse upright partition $a'$, the walls of the vessel and said partition being made of sufficient strength to resist the pressure at which the carbonic-acid gas and beer are to be maintained.

The partition $a'$ divides the vessel $a$ into two compartments—a smaller one $c$ for receiving a charge of carbonic-acid gas and a larger one $c'$ for receiving the quantity of lager-beer or similar liquor. The walls of the vessel $a$, as well as of the partition $a'$, are preferably made thicker at their lower ends and tapering slightly at the upper ends, so as to permit the vessel to be conveniently withdrawn from the mold when made in the glass factory. The partition $a'$ is provided near its upper end with a check-valve $c^2$, by which a certain quantity of carbonic-acid gas is automatically drawn from the compartment containing the gas into the compartment containing the beer when a quantity of beer has been withdrawn from the siphon-tube.

The cover $d$ is preferably made of glass and seated by means of a circular groove and a transverse groove on the upper end of the glass vessel $a$ and partition $a'$, a gasket $m$, of india-rubber or other material, being preferably interposed between the vessel, partition, and the grooves in the cover $d$. The gasket $m$ has a portion which is confined between the cover $d$ and the upper edge of the partition $a'$, as shown in Fig. 3. The upper surface of the cover $d$ is made convex and provided with diametrical grooved ribs $d^3$, into which are placed radial wire bails, said bails crossing each other at right angles at the center, extending over the edge of the cover and being bent in downward direction and in the form of eyes $e'$, to which are applied links $e^2$, having inwardly-bent hooks $e^3$ at the lower end, said hooks engaging with a wire $e^4$, that is rigidly applied to the upper part of the glass vessel $a$ below a projecting shoulder or rim $a^2$ of the same.

Adjacent to the circumferential rim $a^2$ are arranged depressions $e^5$ in the outer surface of the glass vessel $a$, so as to permit engagement of the hook-shaped ends of the wire links $e^2$. When the hook-shaped ends of the links $e^2$ are placed in position, the cover is firmly connected at four points to the glass vessel $a$, and thereby held firmly in position. A wire bail $f$, which may be made of somewhat stronger wire than the locking-bails and which is bent in downward direction at diametrically opposite points in the depressions of the cover and rim of the vessel $a$ and bent inwardly so as to exert a certain tension on the same, is also provided, the lower ends of the bail being bent inwardly, so as to engage the circumferential ring $e^4$ in the same manner as the links of the locking-bails, the depressions below the rim $a^2$ and ring $e^4$ being arranged in the vessel $a$ in the same manner as for the hook-shaped ends of the wire links $e^2$. The bail $f$ is located parallel with the partition in the center of the cover, while the locking-bails are arranged below the same at an angle of forty-five degrees to the bail.

The cover $d$ is further provided in a plane at one side of the supporting-bail $f$ with a valved charging-opening $g$ and at the other side of the bail with a valve-casing $h$, which is screwed into an opening of the cover and which is connected at its lower part with a siphon-tube $t$, which extends from the cover into a depression of the bottom of the compartment $c'$, the lower end of the siphon-tube being cut off at an incline, so as to discharge nearly all the liquor contained in the larger compartment $c'$. The upper end of the siphon-tube is cemented or otherwise secured in a bushing $t'$ at the lower part of the valve-casing. A block-valve $v$, located in the valve-casing, closes the upper end of the siphon-tube by means of a threaded stem $u$, that is provided at its upper end with a diametrical rib, so as to be engaged by the grooved end of a key that is inserted into the upper part of the valve-casing, and provided with a disk-shaped handle $h^{\times}$ for turning the valve when opening or closing the same. When the key is inserted in the upper part of the casing and placed in engagement with the diametrical lug of the valve-stem and turned in one direction, the block-valve is raised and lifted away from the upper end of the siphon-tube, so that communication is established between the same and the discharge-spout $s$, through which the liquid is discharged. When the valve-stem is fed in downward direction, so that the valve closes the upper end of the siphon-tube, the communication between the siphon-tube and interior of the compartment $c'$ is interrupted and the discharge of liquid ceases.

For filling the beer-siphon the cover is removed by releasing the links of the wire bails from the hooks of the handle. This is preferably accomplished by means of a tool in which bail and handle are seated, said tool being placed in position over the handle and bails, so that by downward pressure of the same the hooks are simultaneously released from the locking-ring seated below the rim of the vessel $a$. When the cover is removed, the larger compartment is filled with beer up to a level some distance below the check-valve in the upper end of the partition $a'$. The cover is then replaced in position on the vessel $a$ and the bales and handle simultaneously placed on the cover and locked to the circumferential ring of the glass vessel by a downward pressure against the tension of the elastic gasket until the hook-shaped ends of the wire links and handle engage the locking-ring and lock thereby the glass cover in a reliable manner to the upper part of the glass vessel. The discharge-valve is placed in closed position before the cover is applied.

A sufficient quantity of carbonic-acid gas is then admitted under pressure through the valve-nipple $g$ into the compartment $c$, so that the expansion of the gas into the compartment $c'$, which gradually forces out the liquor from the same as the same is successively drawn off by the opening in the valve, can take place. The quantity of gas in the gas-compartment $c$ must be sufficient to fill both compartments and still leave the gas under slight pressure. In other words, if the ratio of the volume of the gas-compartment to that of the larger compartment were one to three the quantity of gas required for filling the interior of the compartments would be equal to four times the contents of the gas-compartment.

When the siphons or dispensers are filled with beer and charged with carbonic-acid gas, they are shipped to the customers, who are supplied with keys for opening the discharge-valve, so that no parts can become detached and lost while the siphons are in transit. When the siphon has been emptied, it is then returned to the bottler for refilling, which is accomplished by removing the cover, cleaning the vessel, filling the larger compartment with beer, replacing and locking the cover, and then charging the gas-compartment with the required quantity of carbonic-acid gas under pressure.

In place of the locking device and handle shown other mechanism for closing the siphons and carrying them may be used, as I do not desire to confine myself to the special locking mechanism and handle shown. In place of the glass cover a metallic cover may be used; but I prefer to use a glass cover, as the contact of malt liquor with metallic parts is to some extent objectionable. As the beer is discharged under pressure of carbonic-acid gas without coming in contact with the air, the same is always fresh, even to the last drop. The siphon permits the supplying of malt liquors in a more attractive form than by the bottles at present in use.

Having thus described my invention, I claim as new and desire to secure by Letters Patent—

1. A beer-siphon comprising a receptacle having an integral upright partition therein dividing the same laterally into two compartments, a check-valve in said partition near the upper edge of the same, a cover for said receptacle, an inlet-valve in said cover in communication with one of said compartments, and a valved discharge or siphon tube carried by said cover and extending downwardly into the other compartment.

2. A beer-siphon comprising a receptacle, an upright partition in said receptacle dividing the same into two compartments arranged side by side, a cover for said receptacle, an inlet-valve in said cover above one of said compartments, a discharge-pipe carried by said cover and leading into the other compartment, a gasket interposed between said cover and said receptacle and having a portion confined between the former and the upper edge of said partition, and means to lock said cover to said receptacle.

In testimony that I claim the foregoing as my invention I have signed my name in presence of two subscribing witnesses.

GEORG PILLER.

Witnesses:
  PAUL GOEPEL,
  HENRY J. SUHRBIER.